(12) United States Patent
Douzono

(10) Patent No.: US 8,559,796 B2
(45) Date of Patent: Oct. 15, 2013

(54) VIDEO RECORDER APPARATUS FOR RECORDING MOVING PICTURE FILE IN DETACHABLE RECORDING MEDIUM

(75) Inventor: Takeshi Douzono, Osaka (JP)

(73) Assignee: Panasonic Corporation, Osaka (JP)

( * ) Notice: Subject to any disclaimer, the term of this patent is extended or adjusted under 35 U.S.C. 154(b) by 1195 days.

(21) Appl. No.: 11/918,655

(22) PCT Filed: Apr. 17, 2006

(86) PCT No.: PCT/JP2006/308019
§ 371 (c)(1),
(2), (4) Date: Feb. 6, 2008

(87) PCT Pub. No.: WO2006/112429
PCT Pub. Date: Oct. 26, 2006

(65) Prior Publication Data
US 2009/0067814 A1    Mar. 12, 2009

(30) Foreign Application Priority Data
Apr. 18, 2005  (JP) ................................ 2005-119238

(51) Int. Cl.
H04N 5/92    (2006.01)
(52) U.S. Cl.
USPC ........................................................ 386/326
(58) Field of Classification Search
USPC ........................................................ 386/326
See application file for complete search history.

(56) References Cited

U.S. PATENT DOCUMENTS

| 2003/0112870 A1 | 6/2003 | Fukuda et al. | |
| 2006/0140591 A1* | 6/2006 | Estevez et al. | 386/105 |
| 2006/0269226 A1* | 11/2006 | Ito et al. | 386/95 |
| 2007/0033419 A1* | 2/2007 | Kocher et al. | 713/193 |
| 2007/0285295 A1* | 12/2007 | Toraichi et al. | 341/155 |
| 2009/0116821 A1* | 5/2009 | Shibamiya et al. | 386/124 |

FOREIGN PATENT DOCUMENTS

| EP | 1 322 121 | 6/2003 |
| JP | 2002-125185 | 4/2002 |
| JP | 2003-078874 | 3/2003 |
| JP | 2004-336627 | 11/2004 |
| JP | 2005-235246 | 9/2005 |

OTHER PUBLICATIONS

International Search Report of Jul. 18, 2006 issued in the International Application No. PCT/JP2006/308019.
Supplementary European Search Report issued Nov. 4, 2009 in Application No. EP 06 73 1948.
International Preliminary Report on Patentability issued Nov. 1, 2007 in the International (PCT) Application No. PCT/JP2006/308019.

* cited by examiner

Primary Examiner — Kambiz Zand
Assistant Examiner — Benjamin Kaplan
(74) Attorney, Agent, or Firm — Wenderoth, Lind & Ponack, L.L.P.

(57) ABSTRACT

A television video recorder apparatus is provided which is capable of generating a moving picture file reproducible in user's intended video quality and volume on a mobile terminal apparatus. The television video recorder apparatus extracts encoding condition information from a memory card in which a first moving picture file encoded under predetermined encoding conditions and having the encoding conditions is stored, and stores the extracted encoding condition information in a rewritable ROM. Next, the television video recorder apparatus sets the encoding conditions on the basis of the encoding condition information stored in the rewritable ROM, generates a second moving picture file by encoding a video signal and an audio signal to be recorded in accordance with the set encoding conditions, and stores the generated second moving picture file in the memory card.

14 Claims, 12 Drawing Sheets

Fig.9

| REPRODUCTION ENVIRONMENT | BRIGHTNESS | BLACK LEVEL | COLOR DENSITY | COLOR SHADE | SHARPNESS | COLOR TEMPERATURE | VOLUME | LOW TONE | HIGH TONE |
|---|---|---|---|---|---|---|---|---|---|
| CROWD | +10 | 0 | +5 | STANDARD | -5 | MIDDLE | 17 | +3 | +3 |
| ⋮ | | | | | | | | | |
| IN TRAIN | +3 | -5 | +5 | LIGHT | +5 | HIGH | 37 | +13 | -5 |
| ⋮ | | | | | | | | | |
| PARK AT NIGHT | -5 | +5 | 0 | DEEP | +10 | LOW | 10 | -5 | 0 |
| ⋮ | | | | | | | | | |

32

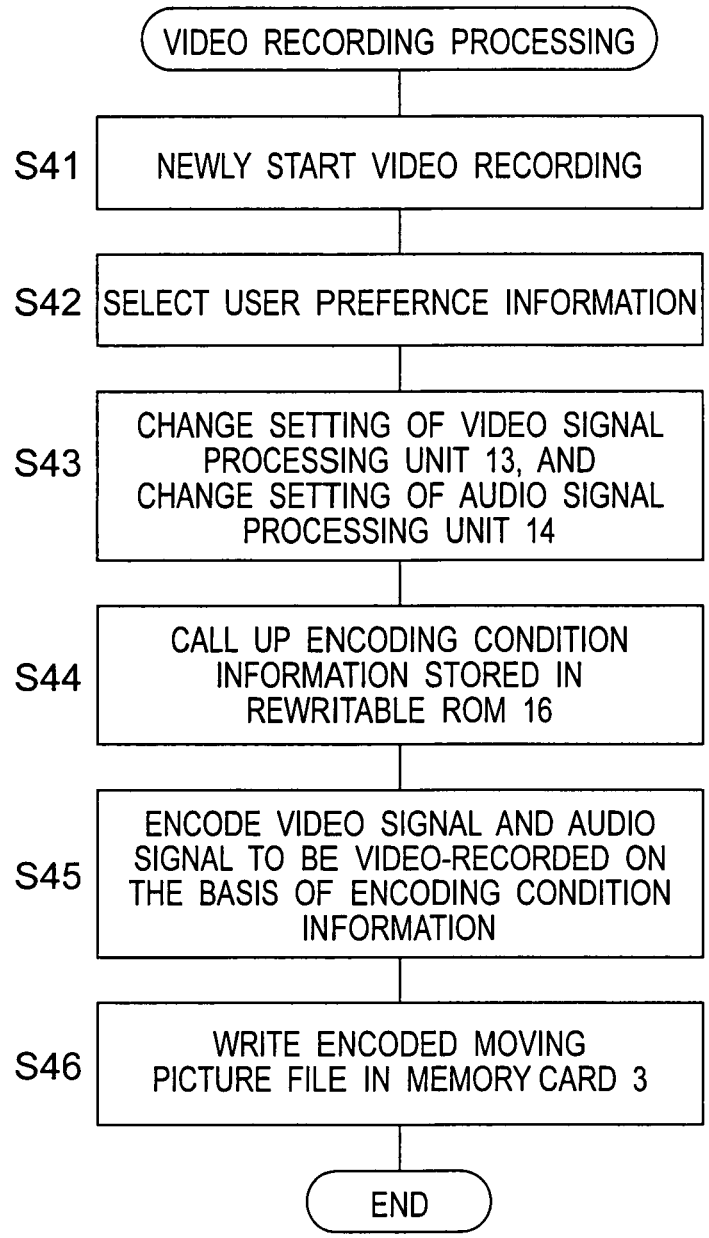

Fig.12

| USER PREFERENCE | BRIGHTNESS | BLACK LEVEL | COLOR DENSITY | COLOR SHADE | SHARPNESS | COLOR TEMPERATURE | VOLUME | LOW TONE | HIGH TONE |
|---|---|---|---|---|---|---|---|---|---|
| RELAXING MODE | +10 | 0 | −5 | LIGHT | −5 | MIDDLE | 10 | −3 | −3 |

| USER PREFERENCE | BRIGHTNESS | BLACK LEVEL | COLOR DENSITY | COLOR SHADE | SHARPNESS | COLOR TEMPERATURE | VOLUME | LOW TONE | HIGH TONE |
|---|---|---|---|---|---|---|---|---|---|
| ALIVE MODE | +3 | −5 | +5 | DEEP | +5 | HIGH | 37 | +13 | −5 |

| USER PREFERENCE | BRIGHTNESS | BLACK LEVEL | COLOR DENSITY | COLOR SHADE | SHARPNESS | COLOR TEMPERATURE | VOLUME | LOW TONE | HIGH TONE |
|---|---|---|---|---|---|---|---|---|---|
| CONCERT MODE | −5 | +5 | 0 | STANDARD | +10 | LOW | 17 | +5 | +8 |

33

VIDEO RECORDER APPARATUS FOR RECORDING MOVING PICTURE FILE IN DETACHABLE RECORDING MEDIUM

TECHNICAL FIELD

The present invention relates to a video recorder apparatus such as a television apparatus with a video recording function capable of recording a moving picture file in a detachable recording medium.

BACKGROUND ART

In recent years, there has been increasing a mobile terminal apparatus or equipment such as a mobile phone or a personal digital assistance (referred to as a PDA hereinafter), which has a function for reproducing a highly compressed moving picture file with a low bit rate having a format of MPEG4 or the like. As for such a reproducing function, there is assumed such a using method that a moving picture file having a format of the MPEG4 or the like recorded in a secure digital (referred to as an SD hereinafter) memory card or the like at home is enjoyed outdoors using a mobile phone or a PDA. In order to effectively utilize a recording medium having a limited capacity, there has been proposed a setting apparatus for video recording conditions which performs video recording on the basis of parameter values concerning the optimum video recording condition (or encoding condition) (See a patent document 1, for example).

Patent document 1: Japanese patent laid-open publication No. JP-2002-125185-A.

There are various kinds of equipments such as a mobile phone, a PDA, or the like, for example, one having a video recording and reproducing function, one having only a reproducing function, or the like; and reproducible files are also different from each other depending on the equipments. A file of the MPEG4 will be described as an example of the moving picture file. In the MPEG4 standard, the specifications such as the maximum bit rate, a frame rate, and a pixel size of the moving picture file are specified. Whether or not the moving picture file can be reproduced by equipment such as a mobile phone or a PDA is determined whether or not the moving picture file complies with the specifications. Therefore, this leads to such a case that the moving picture file video-recorded by the technology disclosed in the patent document 1 cannot be reproduced by a user's mobile phone or PDA. In addition, in the patent document 1, setting information for video recording conditions is recorded in a detachable recording medium. This information is unnecessary information for the mobile phone or the PDA, and there is such a case that the information is deleted by mistake.

The mobile phone or the PDA has features of a small size and portability. In the equipment such as the mobile phone or the PDA, locations for viewing and listening are also simulated in various situations. The functions of video quality adjustment, audio quality adjustment, and the like of the equipment are simplified from the view point of the small size. Consequently, viewing and listening style considerably differ, as compared with such a case that a television apparatus having a function for reproducing moving picture files which have formats of the MPEG4 or the like is used, and the moving picture files are viewed and listened indoors.

The equipment of the existing television apparatus or the like having the function for reproducing moving picture files which have current formats of the MPEG4 or the like is premised on setting video recording conditions in consideration of mainly performing video recording and reproducing by the equipment itself. Therefore, there is a possibility that the moving picture files video-recorded by such television apparatus with a video recording function are not suitable for reproduction by other mobile terminal apparatus.

An object of the present invention is to solve the foregoing problems and to provide a video recorder apparatus capable of generating a moving picture file reproducible in user's intended video quality and volume on a mobile terminal apparatus.

SUMMARY OF THE INVENTION

According to the first aspect of the present invention, there is provided a video recorder apparatus including extracting means, first storage means, and storing means. The extracting means extracts predetermined encoding conditions from a recording medium that stores a first moving picture file, which is encoded by the encoding conditions and has the encoding conditions. The first storage means stores the extracted encoding conditions. The encoding means generates a second moving picture file by encoding a video signal and an audio signal to be recorded in accordance with the encoding conditions stored in the first storage means. The storing means stores the generated second moving picture file in one of the recording medium and a further recording medium.

In addition, according to the second aspect of the present invention, there is provided a video recorder apparatus extracting means, first storage means, first storage means, encoding means, and storing means. The extracting means extracts the respective encoding conditions from at least one recording medium that stores a plurality of first moving picture files encoded under a plurality of encoding conditions different from each other, where each of the first moving picture files have the respective encoding conditions. The first storage means stores a plurality of extracted encoding conditions. The encoding means selects one of the plurality of encoding conditions stored in the first storage means, and generates a second moving picture file by encoding a video signal and an audio signal to be recorded in accordance with the selected encoding conditions. The storing means stores the generated second moving picture file in one of at least one the recording medium and a further recording medium.

In the above-mentioned video recorder apparatus, the first and the second moving picture files encoded by the encoding conditions are reproduced by a predetermined reproduction apparatus.

In the above-mentioned video recorder apparatus, the first storage means further stores encoding conditions inputted by a user.

The above-mentioned video recorder apparatus further includes second storage means, selecting means, and signal processing means. The second storage means stores a plurality of items of reproduction environment information, where each of the items of the reproduction environment information includes a plurality of parameters upon executing a predetermined processing on the video signal and the audio signal in response to a plurality of reproduction environments different from each other upon reproducing a moving picture file. The selecting means selects one of the plurality of items of reproduction environment information. The signal processing means executes the predetermined processing on the video signal and the audio signal on the basis of parameters of the selected reproduction environment information, generates processed video signal and the audio signal, and supplies a generated video signal and the audio signal to the encoding means as the video signal and the audio signal to be recorded.

In the above-mentioned video recorder apparatus, second storage means stores reproduction environment information inputted by a user.

The above-mentioned video recorder apparatus further includes third storing means, selecting means, and signal processing means. The third storing means stores a plurality of items of user preference information, each including a plurality of parameters upon executing a predetermined processing on the video signal and the audio signal in response to user preference. The selecting means selects one of the plurality of items of user preference information. The signal processing means executes the predetermined processing on the video signal and the audio signal on the basis of parameters of the selected user preference information, generates processed video signal and the audio signal, and for supplying a generated video signal and audio signal to the encoding means as the video signal and the audio signal to be recorded.

In the above-mentioned video recorder apparatus, the third storing means stores user preference information inputted by a user.

Therefore, according to the video recorder apparatus according to the present invention, the video recorder apparatus is useful when a moving picture file stored in a detachable recording medium is enjoyed outdoors on a mobile terminal apparatus such as a mobile phone or a PDA, and the moving picture file complying with reproduction environment and user preference can be generated so as to utilize the maximum performance concerning specifications of equipment to be used.

According to the present invention, by narrowing down reproduction equipment and reproduction environment in video recording while making the most of the features of small size and portability provided by a mobile terminal apparatus such as a mobile phone or a PDA, a video recorder apparatus such as a television apparatus with a video recording function can be provided which generates a moving picture file reproducible in user's intended video quality and volume even in the mobile terminal apparatus.

BRIEF DESCRIPTION OF THE DRAWINGS

FIG. 9 is a schematic view showing an example of data of reproduction environment information recorded on a reproduction environment information table 32 shown in FIG. 7;

FIG. 11 is a flow chart showing a video recording processing, which is executed by a microcomputer 15 of the television video recorder apparatus 1 shown in FIG. 10; and FIG. 12 is a schematic view showing an example of data of user preference information recorded on a user preference information table 33 shown in FIG. 10.

DESCRIPTION OF REFERENCE NUMERALS

1 . . . Television video recorder apparatus,
2 . . . Mobile terminal apparatus,
3 . . . Memory card,
11 . . . Antenna,
12 . . . Tuner,
13 . . . Video signal processing unit,
14 . . . Audio signal processing unit,
15 . . . Microcomputer,
16 . . . Rewritable ROM,
17 and 41 . . . ROM,
18 and 42 . . . RAM,
19 . . . Input device,
20 . . . Input prompt display unit,
21 and 44 . . . Memory card interface,
21A and 44A . . . Memory card socket,
31 . . . Encoding condition information table,
32 . . . Reproduction environment information table,
33 . . . User preference information table,
40 . . . CPU,
43 . . . Hard disc memory,
45 . . . Keyboard,
46 . . . Display,
47 . . . D/A converter,
48 and 51 . . . Amplifier,
49 . . . Speaker,
50 . . . Microphone,
52 . . . A/D converter,
53 . . . CCD imaging device,
54 . . . Imaging device interface, and
55 . . . Bus.

DETAILED DESCRIPTION OF THE INVENTION

First Embodiment

Figure 1:
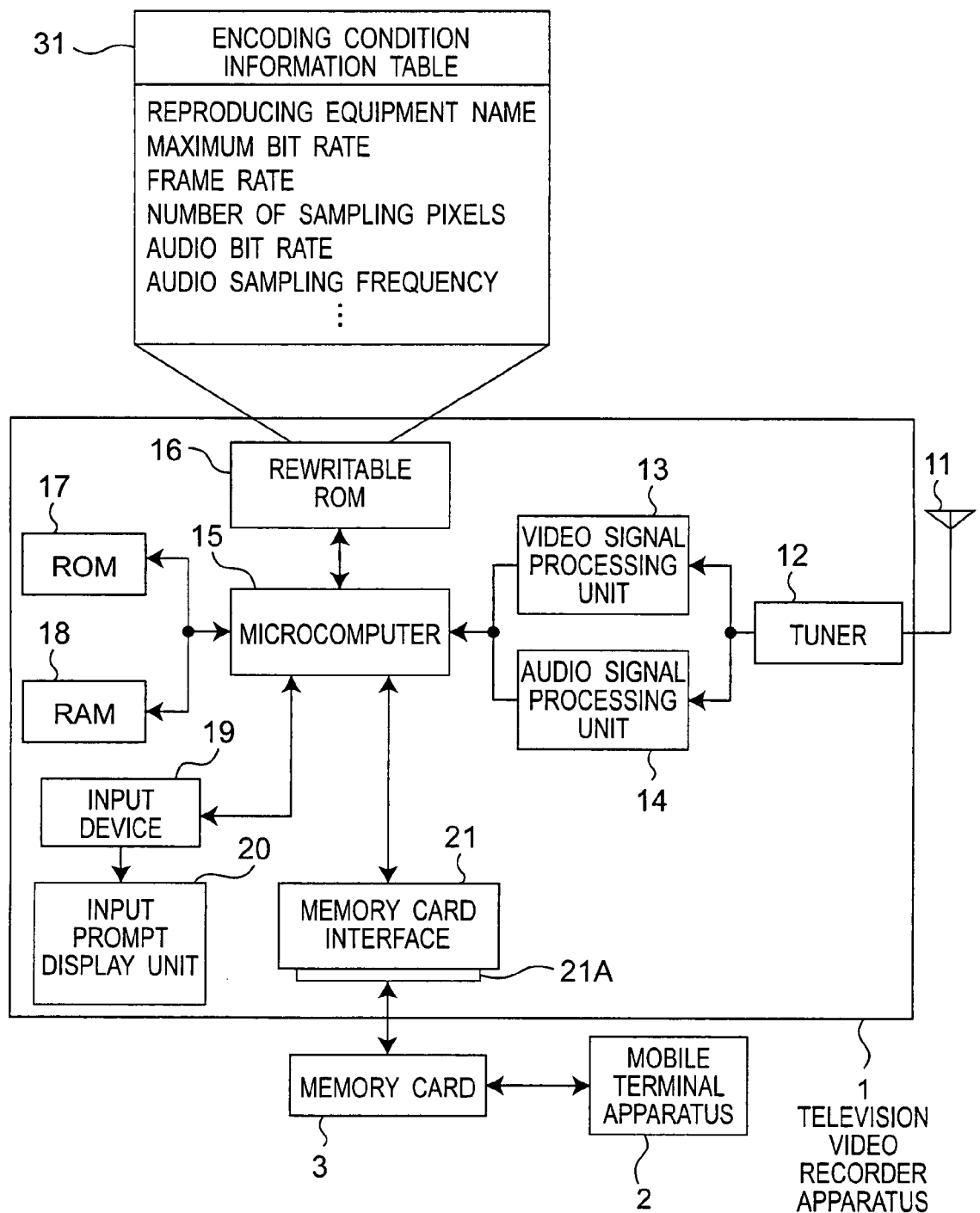
FIG. 1 is a block diagram showing a configuration of a television video recorder apparatus 1 according to a first embodiment of the present invention.

FIG. 1 is a block diagram showing a configuration of a television video recorder apparatus 1 according to a first embodiment of the present invention. The television video recorder apparatus 1 according to the present embodiment can generate a moving picture file, which is provided for reproducing in a mobile terminal apparatus 2 such as a PDA or a mobile phone, and can record the same in a memory card 3. The television video recorder apparatus 1 may be in a form of household television apparatus with a video recording function, for example. The mobile terminal apparatus 2 has a video recording function and a reproducing function of a moving picture file; and then, it is possible to generate a moving picture file under predetermined encoding conditions and to store in the memory card 3, and to reproduce the moving picture file generated under the above encoding conditions.

The television video recorder apparatus 1 according to the present embodiment is characterized in that encoding condition information is extracted from the memory card 3 that stores therein a first moving picture file encoded under the predetermined encoding conditions and having the encoding conditions, and the extracted encoding condition information is stored in a rewritable ROM 16. Next, the television video recorder apparatus 1 is characterized to set the encoding conditions on the basis of the encoding condition information stored in the rewritable ROM 16, to generate a second moving picture file by encoding a video signal and an audio signal to be recorded in accordance with the set encoding conditions, and to store the generated second moving picture file in the memory card 3.

A hardware configuration of the television video recorder apparatus 1 will be simply described with reference to FIG. 1. Referring to FIG. 1, a tuner 12 demodulates a television broadcasting signal received by an antenna 11; extracts the video signal from the demodulated television broadcasting signal and outputs the same to a video signal processing unit 13; and extracts the audio signal and outputs the same to an audio signal processing unit 14. The video signal processing unit 13 executes a predetermined prefix processing on the video signal from the tuner 12 in order to generate a source of the moving picture file to be recorded in the memory card 3. In a manner similar to that of above, the audio signal processing unit 14 executes a predetermined prefix processing on the audio signal from the tuner 12 in order to generate the source of the moving picture file to be recorded in the memory card 3, and then, these processed video signal and the audio signal are inputted in the microcomputer 15, respectively.

The rewritable ROM 16, a ROM 17, a RAM 18, an input device 19, and a memory card interface 21 are further connected to the microcomputer 15, and the microcomputer 15 controls the whole operation of the television video recorder apparatus 1. A controlling program of the television video recorder apparatus 1 is stored in the ROM 17, and the microcomputer 15 executes the controlling program stored in the RAM 18. The rewritable ROM 16 is of an EEPROM, for example; the rewritable ROM 16 stores an encoding condition information table 31 including encoding condition information (to be described in detail later) in generating the moving picture file to be recorded in the memory card 3, and saves the same. The microcomputer 15 generates the moving picture file to be recorded in the memory card 3 by encoding the video signal processed by the video signal processing unit 13 and the audio signal processed by the audio signal processing unit 14 on the RAM 18 in accordance with the encoding conditions stored in the encoding condition information table 31.

The television video recorder apparatus 1 is operated by a user via the input device 19. In the case when specific user's input is required for processing, the microcomputer 15 displays a prompt on an input prompt display unit 20 connected to the input device 19 in order to persuade to put the user's input. The memory card interface 21 includes a memory card socket 21A which is provided for attaching the memory card 3, and reads out/writes data from/into the memory card 3. When the moving picture file in the memory card 3 is reproduced, the microcomputer 15 transfers the data of the moving picture file from the memory card 3 to the RAM 18, and stores, and processes the data in accordance with the controlling program. When the moving picture file is recorded in the memory card 3, the microcomputer 15 transfers the data of the moving picture file on the RAM 18 to the memory card 3 and stores.

The encoding condition information table 31 retains encoding condition information linking to each of a plurality of different mobile terminal apparatuses 2. The respective encoding condition information on the encoding condition information table 31 includes a set of parameter values concerning the moving picture file reproducible by a certain mobile terminal apparatus 2. As an example, the encoding condition information includes a reproducing equipment name which specifies the mobile terminal apparatus 2 such as a mobile phone or a PDA, which reproduces the moving picture file; the maximum bit rate information of the moving picture file reproducible by the mobile terminal apparatus 2; frame rate information; number of sampling pixels; audio bit rate information; and audio sampling frequency information. In the present embodiment, the encoding condition information means that upon performing video recording by the mobile terminal apparatus 2, and is obtained from the encoding condition information contained in the moving picture file, which is generated by the video recording, as will be described later with reference to FIG. 3.

The television video recorder apparatus 1 may be provided with other source device which is provided for obtaining a television broadcasting signal in place of the antenna 11 and the tuner 12. In order to persuade a user's to put an input necessary for processing, the television video recorder apparatus 1 may also display a prompt on a display apparatus (not shown) which is provided for displaying a television program, or may give sound instruction using a speaker (not shown), in place of displaying the prompt on the input prompt display unit 20.

Figure 2:
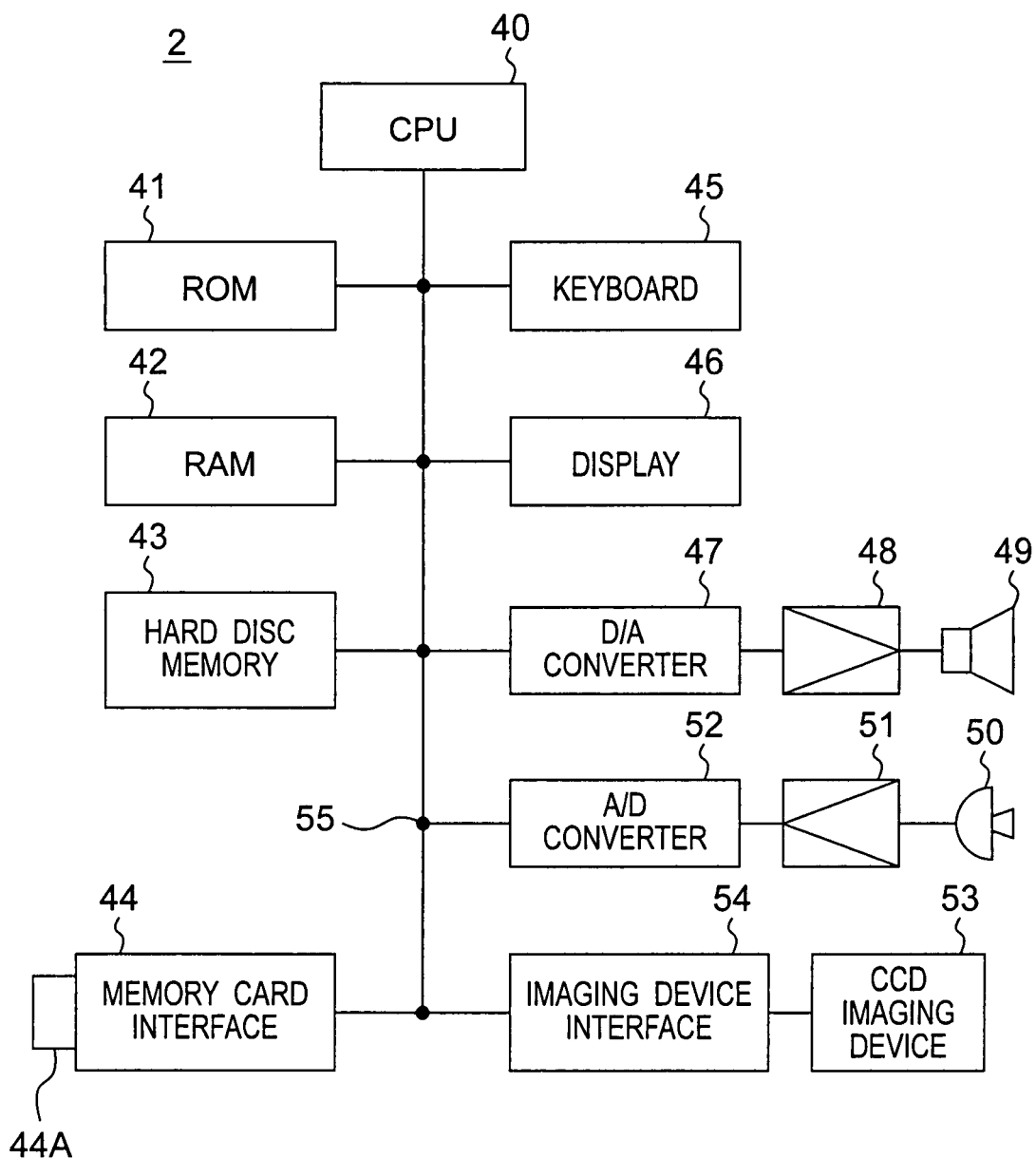
FIG. 2 is a block diagram showing a configuration of a mobile terminal apparatus 2 which reproduces a moving picture file recorded in a memory card 3 by the television video recorder apparatus 1 shown in FIG. 1.

FIG. 2 is a block diagram showing a configuration of the mobile terminal apparatus 2 which reproduces the moving picture file recorded in the memory card 3 by the television video recorder apparatus 1 shown in FIG. 1. Referring to FIG. 2, the mobile terminal apparatus 2 is configured so that the apparatus itself can further generate a moving picture file (that is, the apparatus itself executes photographing of the moving picture image and audio recording), and can also record in the memory card 3. The mobile terminal apparatus 2 includes (a) a CPU 40 which controls the whole operation of the mobile terminal apparatus 2, (b) a ROM 41 that stores the controlling program therein, (c) a RAM 42 used upon executing the controlling program, (d) a hard disc memory 43 which stores other additional data therein, (e) a memory card interface 44 having a memory card socket 44A which is provided for attaching the memory card 3 and reading out/writing data from/into the memory card 3, (f) an operating keyboard 45, and (g) a display 46 which displays a moving picture file; and these constituent elements 40, 41, 42, 43, 44, 45, and 46 are connected with each other by a bus 55. The mobile terminal apparatus 2 further includes a D/A converter 47, an amplifier 48, and a speaker 49; and the input side of the D/A converter 47 is connected to the bus 55, and the output side thereof is connected to the speaker 49 via the amplifier 48. The mobile terminal apparatus 2 further includes a microphone 50, an amplifier 51, and an A/D converter 52; and the microphone 50 is connected via the amplifier 51 on the input side of the A/D converter 52, and the output side thereof is connected to the bus 55. The mobile terminal apparatus 2 further includes a charge coupled device (referred to as a CCD hereinafter) imaging device 53 and an imaging device interface 54; and the CCD imaging device 53 is connected with the input side of the imaging device interface 53, and the output side thereof is connected to the bus 55.

The CPU 40 reads out the moving picture file from the memory card 3, decodes a video signal and an audio signal, outputs the video signal to the display 46, and outputs the audio signal to the speaker 49 via the D/A converter 47 and the amplifier 48. The CPU 40 also obtains a moving picture image photographed by the CCD imaging device 53 via the imaging device interface 54 as a video signal, obtains an audio signal obtained by the microphone 50 via the amplifier 51 and the A/D converter 52, generates a moving picture file of a predetermined format on the basis of the obtained video signal and the audio signal, and records in the memory card 3.

Figure 3:
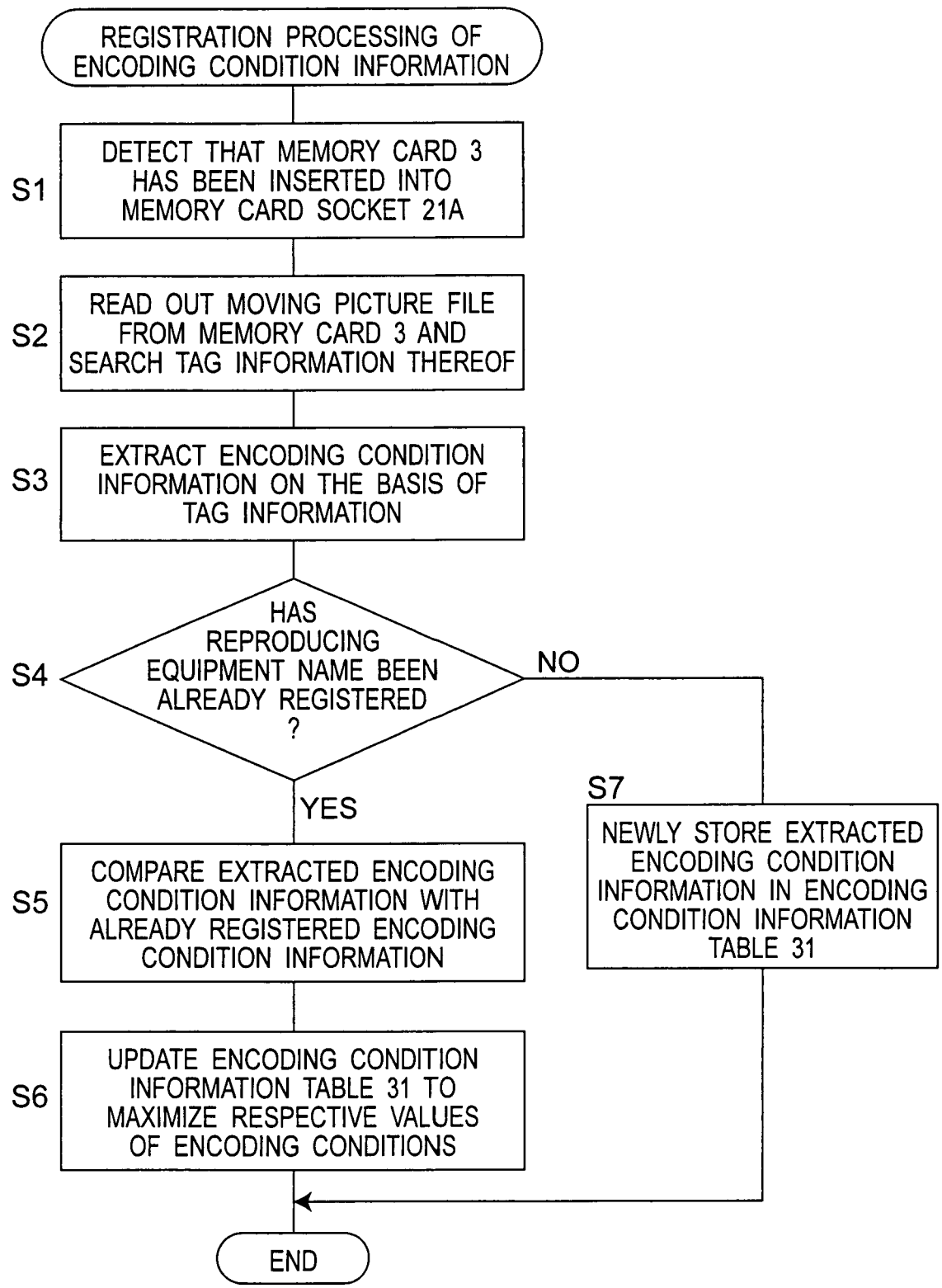
FIG. 3 is a flow chart showing a registration processing of encoding condition information, which is executed by a microcomputer 15 of the television video recorder apparatus 1 shown in FIG. 1.

FIG. 3 is a flow chart showing a registration processing of encoding condition information, which is executed by the microcomputer 15 of the television video recorder apparatus 1 shown in FIG. 1. In this processing, the television video recorder apparatus 1 obtains the encoding conditions in generating the moving picture file by the mobile terminal apparatus 2 which has the video recording function. Accordingly, the television video recorder apparatus 1 obtains the encoding condition information which is provided for generating the moving picture file suitable for reproduction in the mobile terminal apparatus 2. Referring to FIG. 3, first of all, when a user inserts the memory card 3, that stores the moving picture file video-recorded by the mobile terminal apparatus 2 therein, into the memory card socket 21A. In step S1, the microcomputer 15 detects that the memory card 3 has been inserted into the memory card socket 21A. In step S2, the microcomputer 15 reads data of the moving picture file stored in the memory card 3 into the RAM 18, and searches tag information of the moving picture file thereof.

Figure 6:
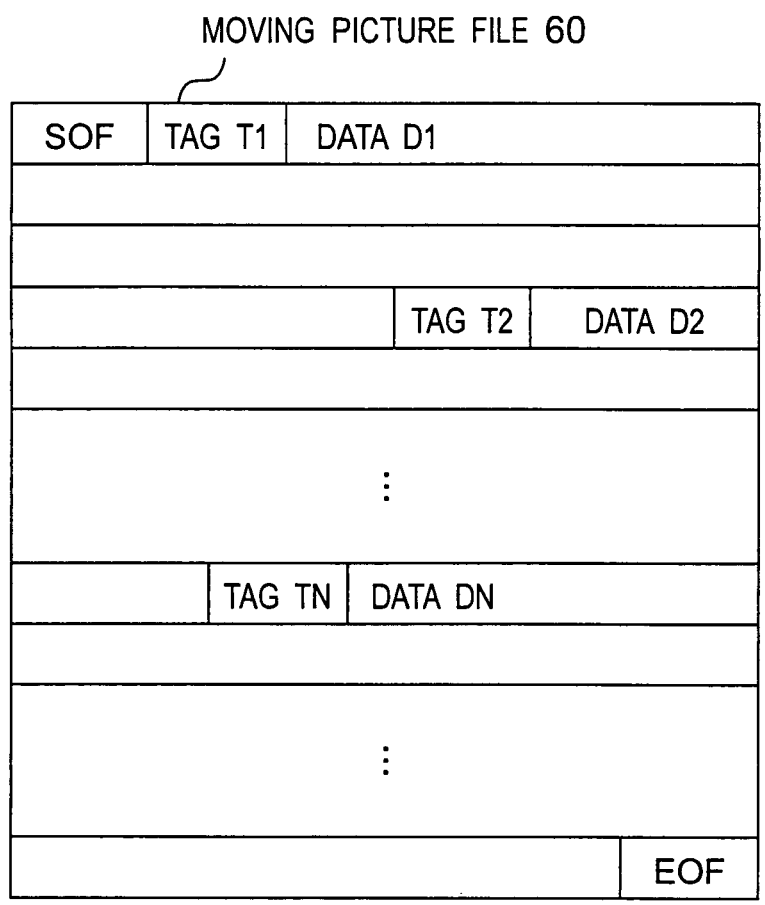
FIG. 6 is a schematic view showing a format of a moving picture file 60 recorded in the memory card 3 shown in FIG. 1.

In this case, the tag information will be described. For example, in the moving picture file video-recorded by a mobile phone or a PDA, which is in conformity with the MPEG4, information such as an equipment name of an equipment that records the moving picture file, the maximum bit rate, the frame rate, and the pixel size is recorded as the tag information. The television video recorder apparatus 1 extracts the encoding condition information by searching this tag information in the data of the moving picture file read into the RAM 18. A specific file configuration of the moving picture file will be described with reference to FIG. 6. FIG. 6 is a schematic view showing a format of a moving picture file 60 to be recorded in the memory card 3 shown in FIG. 1. The moving picture file 60 starts from "start of file" (referred to as an SOF hereinafter) and ends at "end of file" (referred to as an EOF hereinafter). The moving picture file 60 is configured by a combination of a plurality of tags and data. For example, a tag T1 is a keyword representing the equipment name, and an actual equipment name is recorded as data D1. Similarly, for example, a tag T2 is a keyword representing the frame rate, and an actual frame rate is recorded as data D2.

Referring to FIG. 3 again, in step S3, the microcomputer 15 extracts the encoding condition information included in the moving picture file on the basis of the searched tag information. Next, in step S4, it is determined whether or not the reproducing equipment name of the encoding condition information extracted in step S3 has been already registered in the encoding condition information table 31 of the rewritable ROM 16. When it is not registered, in step S7, all of the encoding condition information extracted in step S3 is newly saved in the encoding condition information table 31 on the rewritable ROM 16. When it has been already registered, in step S5, the encoding condition information extracted in step S3 is compared with the encoding condition information linked to the reproducing equipment name and already registered. After that, in step S6, the encoding condition information table 31 is updated so that respective values of the encoding conditions are maximized. Therefore, for example, as for certain equipment, when a value larger than a parameter value concerning the encoding conditions registered in the encoding condition information table 31 is extracted, the larger value is written into the rewritable ROM 16 so as to update the parameter value.

The registration processing of encoding condition information is repeated on a plurality of memory cards 3, that store therein moving picture files encoded under encoding conditions different from each other. Accordingly, the microcomputer 15 can obtain the encoding condition information which is provided for a plurality of different mobile terminal apparatuses 2.

Figure 4:
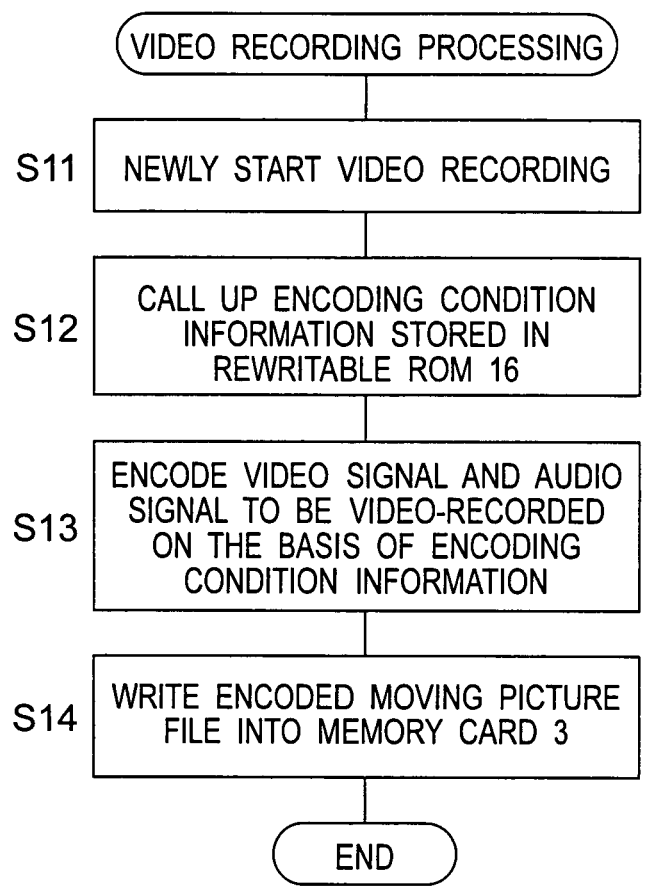
FIG. 4 is a flow chart showing a video recording processing, which is executed by the microcomputer 15 of the television video recorder apparatus 1 shown in FIG. 1.

FIG. 4 is a flow chart showing a video recording processing, which is executed by the microcomputer 15 of the television video recorder apparatus 1 shown in FIG. 1. The microcomputer 15 records the moving picture file in the memory card 3 in accordance with the video recording processing. Referring to FIG. 4, in step S11, the microcomputer 15 newly starts video recording using a television broadcasting signal received via the antenna 11 and the tuner 12 as a source. Next, in step S12, among the encoding condition information stored in the encoding condition information table 31 of the rewritable ROM 16 in step S6 or step S7, the encoding condition information linked to the selected equipment is called up, by selecting the equipment in which the moving picture file to be recorded in the memory card 3 is to be reproduced by the video recording processing, in response to a user's input inputted via the input device 19. In step S13, the microcomputer 15 sets the encoding conditions on the basis of the called up encoding condition information, and a video signal and an audio signal to be video-recorded are encoded on the RAM 18 in accordance with the set encoding conditions. In step S14, the microcomputer 15 records the encoded a moving picture file in the memory card 3 by the memory card interface 21, and completes this processing. The memory card 3 may be the same as or different from the memory card 3 inserted into the memory card slot 21A in step S1 shown in FIG. 3. After the video recording processing is ended, the user detaches the memory card 3 from the memory card slot 21A of the television video recorder apparatus 1, inserts the memory card 3 into a memory card slot 44A of the mobile terminal apparatus 2, and reproduces the moving picture file recorded in the memory card 3 in the mobile terminal apparatus 2.

As described above, according to the mobile terminal apparatus 2 provided with the video recording function and the reproducing function, the moving picture file encoded under the encoding conditions which are the same as the encoding conditions of the moving picture file formerly video-recorded by the mobile terminal apparatus 2 is generated, and is recorded in the memory card 3. Accordingly, the television video recorder apparatus 1 can generate a moving picture reproducible by the mobile terminal apparatus 2.

On the other hand, when the mobile terminal apparatus 2 is a reproduction-only apparatus, the equipment itself cannot perform video recording. Therefore, when the encoding conditions (that is, features such as the maximum bit rate, the frame rate, and the pixel size) which are provided for generating the moving picture file reproducible by the mobile terminal apparatus 2 have to be obtained, the encoding condition information cannot be extracted from the moving picture file video-recorded by the mobile terminal apparatus 2, in a manner similar to that of the method described using the flow chart shown in FIG. 3. In order to cope with such case, the processing for registering by inputting the encoding condition information by a user himself will be described with reference to FIG. 5.

Figure 5:
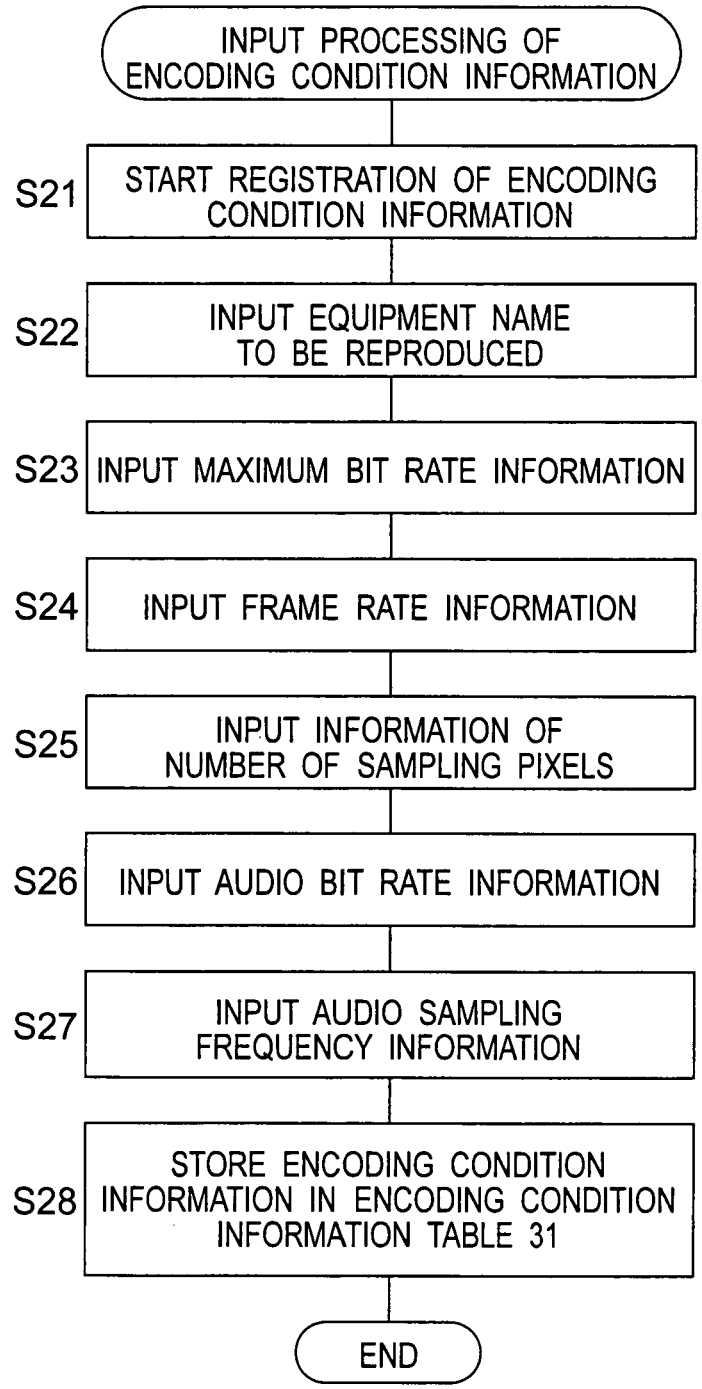
FIG. 5 is a flow chart showing an input processing of encoding condition information, which is executed by the microcomputer 15 of the television video recorder apparatus 1 shown in FIG. 1.

FIG. 5 is a flow chart showing an input processing of encoding condition information, which is executed by the microcomputer 15 of the television video recorder apparatus 1 shown in FIG. 1. In step S21 shown in FIG. 5, first of all, the microcomputer 15 starts the registration of the encoding condition information, and thereafter, in steps S22 to S27, the microcomputer 15 persuades a user to input necessary information using the input device 19 via the input prompt display unit 20. The microcomputer 15 inputs a name of the mobile terminal apparatus 2 which reproduces the moving picture file in step S22. In step S23, the microcomputer 15 inputs maximum bit rate information of the moving picture file reproducible by the mobile terminal apparatus 2. In step S24, the microcomputer 15 inputs frame rate information of the moving picture file reproducible by the mobile terminal apparatus 2. In step S25, the microcomputer 15 inputs number of sampling pixels of the moving picture file reproducible by the mobile terminal apparatus 2. In step S26, the microcomputer 15 inputs audio bit rate information of the moving picture file reproducible by the mobile terminal apparatus 2. Then in step S27, the microcomputer 15 inputs audio sampling frequency information of the moving picture file reproducible by the mobile terminal apparatus 2. In step S28, the microcomputer 15 saves the above inputted encoding condition information to the encoding condition information table 31 of the rewritable ROM 16.

As described above, according to the reproduction-only mobile terminal apparatus 2, the moving picture file encoded under the encoding conditions which are the same as the encoding conditions specified by the user is generated, and is recorded in the memory card 3. Accordingly, the television video recorder apparatus 1 can generate a moving picture reproducible by the mobile terminal apparatus 2.

According to the television video recorder apparatus 1 of the present embodiment, a moving picture file reproducible in user's intended video quality and volume can be generated even in such mobile terminal apparatus 2 while making the most of the features of small size and portability provided by the mobile terminal apparatus 2 such as a mobile phone or a PDA.

Second Embodiment

Figure 7:
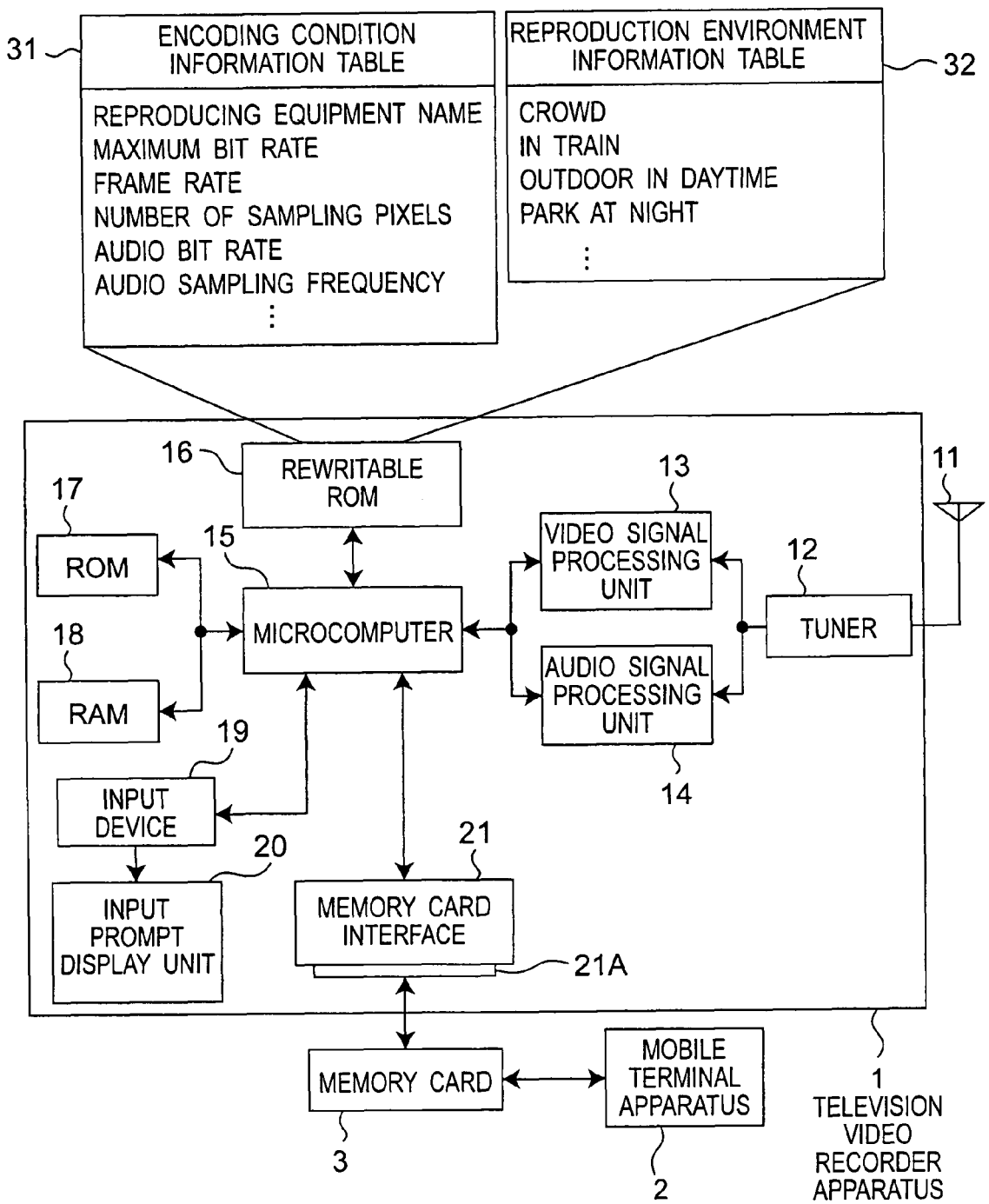
FIG. 7 is a block diagram showing a configuration of a television video recorder apparatus 1 according to a second embodiment of the present invention.

FIG. 7 is a block diagram showing a configuration of a television video recorder apparatus 1 according to a second embodiment of the present invention. In the second embodiment, the same reference numerals are given to those similar to components in the first embodiment; and their detail description will be omitted.

In the second embodiment, the different points from the first embodiment will be described as follows, and the other configuration is the same as that of the first embodiment.

(1) A rewritable ROM 16 saves a reproduction environment information table 32 in addition to a encoding condition information table 31; and (2) A microcomputer 15 controls processing operation of a video signal processing unit 13 and an audio signal processing unit 14 on the basis of reproduction environment information on the reproduction environment information table 32.

According to the television video recorder apparatus 1 according to the present embodiment, it is characterized that (a) the reproduction environment information table 32 stores a plurality of items of reproduction environment information each including a plurality of parameters upon executing a predetermined processing on a video signal and an audio signal in response to a plurality of reproduction environments different from each other upon reproducing a moving picture file; (b) an input device 19 selects one of the plurality of items of the reproduction environment information stored by the reproduction environment information table 32; and (c) the video signal processing unit 13 and the audio signal processing unit 14 execute a predetermined processing on the video signal and the audio signal on the basis of the parameters of the selected reproduction environment information, generate the video signal and the audio signal of post processing, and supply the generated video signal and audio signal to the microcomputer 15 as the video signal and the audio signal to be recorded.

Figure 8:
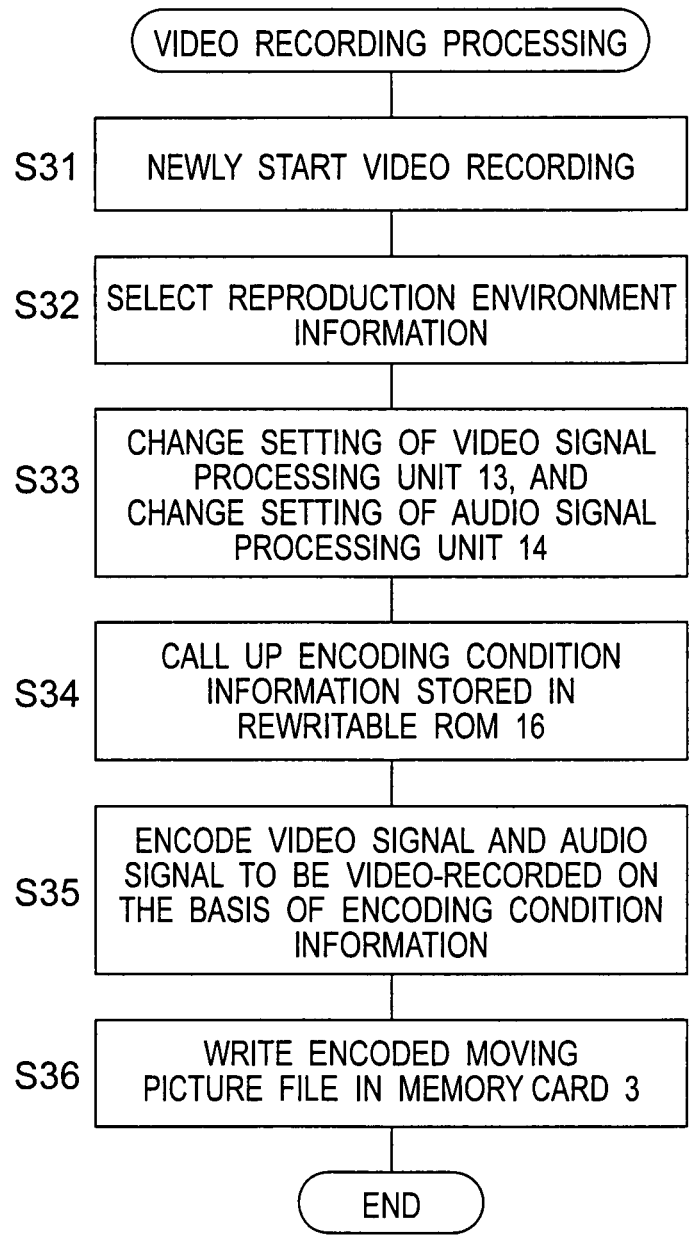
FIG. 8 is a flow chart showing a video recording processing, which is executed by a microcomputer 15 of the television video recorder apparatus 1 shown in FIG. 7.

In the television video recorder apparatus 1 of the present embodiment, the reproduction environment information table 32 is used. Accordingly, moving picture files whose parameters such as color, brightness, and volume are preliminarily optimized can be generated in response to differences in location and environment upon reproducing moving picture files such as "crowd", "in train", "outdoor in daytime", and "park at night", FIG. 8 is a flow chart showing a video recording processing, which is executed by the microcomputer 15 of the television video recorder apparatus 1 shown in FIG. 7. An object of this processing is to generate moving picture files including video and audio suitable for a location (or reproduction environment) where a user uses the mobile terminal apparatus 2. Referring to FIG. 8, in step S31, the microcomputer 15 newly starts the video recording using a television broadcasting signal received via an antenna 11 and a tuner 12 as a source. Next, in step S32, the microcomputer 15 selects one item of reproduction environment information by selecting a location where a user uses the mobile terminal apparatus 2 on the basis of the user's input via the input device 19, and reads out the selected reproduction environment information from the reproduction environment information table 32.

Referring to FIG. 9, the reproduction environment information table 32 of an implemental example will be described. FIG. 9 is a schematic view showing an example of data of reproduction environment information recorded on the reproduction environment information table 32 shown in FIG. 7. In this description, a combination of the reproduction environment and parameters concerning video and audio such as color, brightness, and volume is called as the reproduction environment information. In the reproduction environment information table 32, the reproduction environment (that is, location for reproducing moving picture files) and the parameters of video quality and audio quality are linked. For example, when "crowd" is selected as the reproduction environment, brightness (picture) is set to "+10", the black level is set to "0", the color density is set to "+5", the color shade is set to "standard", the sharpness is set to "−5", the color temperature is set to "middle", the volume is set to "17", the low tone is set to "+3", and the high tone is set to "+3", In place of this, when "in train" or "park at night" is selected as the reproduction environment, parameters of different video quality and audio quality are set in conjunction with the selected result as shown in FIG. 9. The reproduction environment information may preliminarily be stored in the rewritable ROM 16, or a user may add in the rewritable ROM 16 or edit using the input device 19. The reproduction environment information shown in FIG. 9 is merely exemplification, a further item may further be used as the reproduction environment, or a further parameter may be used.

Referring to FIG. 8 again, in step S33, the microcomputer 15 changes setting of the video signal processing unit 13 and the audio signal processing unit 14 in accordance with the selected reproduction environment information. By this setting change, the standard video and standard audio outputted from the tuner 12 are customized according to user's preference which assumes the reproduction environment. Hereinafter, the processing of steps S34 to S36 is executed in a manner similar to that of the steps S12 to S14 shown in FIG. 4. After the video recording processing is ended, the user detaches the memory card 3 from the memory card slot 21A of the television video recorder apparatus 1, inserts the memory card 3 into a memory card slot 44A of the mobile terminal apparatus 2, and reproduces the moving picture file recorded in the memory card 3 of the mobile terminal apparatus 2.

According to the television video recorder apparatus 1 of the present embodiment, a moving picture file reproducible in user's intended video quality and volume can be generated even in the mobile terminal apparatus 2 by performing video recording complying with reproduction equipment and reproduction environment while making the most of the features of small size and portability provided by the mobile terminal apparatus 2 such as a mobile phone or a PDA.

Third Embodiment

Figure 10:
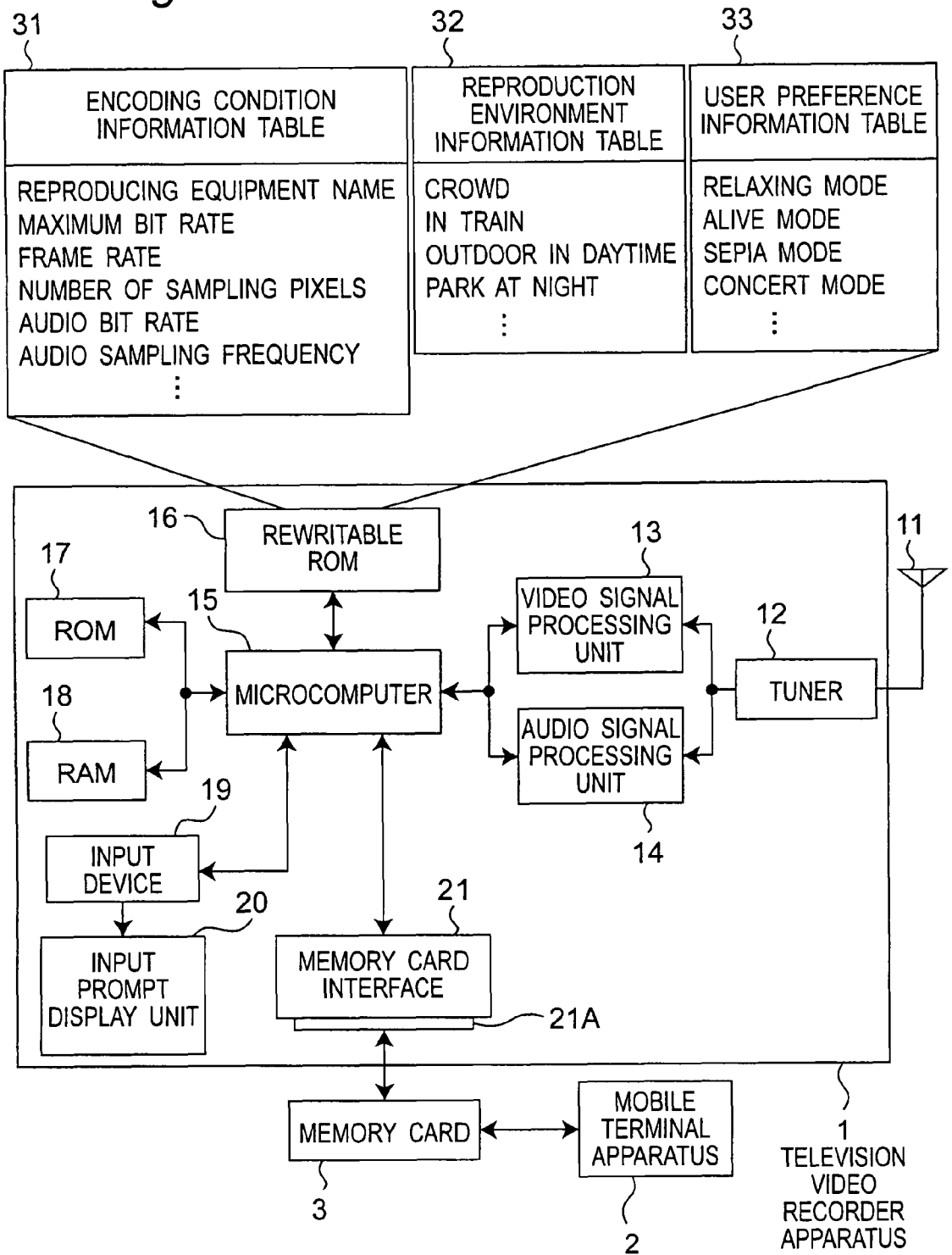
FIG. 10 is a block diagram showing a configuration of a television video recorder apparatus 1 according to a third embodiment of the present invention.

FIG. 10 is a block diagram showing a configuration of a television video recorder apparatus 1 according to a third embodiment of the present invention. In the third embodiment, the same reference numerals are given to those similar to components in the first embodiment and the second embodiment; and their detail description will be omitted.

In the third embodiment, different points from the second embodiment are that a rewritable ROM 16 saves a user preference information table 33 in addition to an encoding condition information table 31 and a reproduction environment information table 32; and the other configuration is the same as that of the second embodiment.

According to the television video recorder apparatus 1 of the present embodiment, it is characterized that (a) the user preference information table 33 stores a plurality of items of user preference information each including a plurality of parameters upon executing a predetermined processing on a video signal and an audio signal in response to user preference; (b) an input device 19 selects one of the plurality of items of the user preference information; (c) a video signal processing unit 13 and an audio signal processing unit 14 execute a predetermined processing on the video signal and the audio signal on the basis of the parameters of the selected user preference information, generate the video signal and the audio signal of post processing, and supply the generated video signal and audio signal to the microcomputer 15 as the video signal and the audio signal to be recorded.

In the television video recorder apparatus 1 of the present embodiment, the user preference information table 33 is used. Accordingly, moving picture files whose parameters such as color, brightness, and volume are preliminarily optimized can be generated in response to differences in user preferences such as "relaxing mode", "alive mode", "sepia mode", and "concert mode", FIG. 11 is a flow chart showing a video recording processing, which is executed by the microcomputer 15 of the television video recorder apparatus 1 shown in FIG. 10. An object of this processing is to generate moving picture files with video and audio customized to the user preference. Referring to FIG. 11, in step S41, the microcomputer 15 newly starts video recording using a television broadcasting signal received via an antenna 11 and a tuner 12 as a source. Next, in step S42, the microcomputer 15 selects the user preference information according to user mood on the basis of a user's input via the input device 19, and reads out the selected user preference information from the user preference information table 33.

Referring to FIG. 12, the user preference information of an implemental example will be described. FIG. 12 is a schematic view showing an example of data of user preference information recorded on the user preference information table 33 shown in FIG. 10. In this description, a combination of the user preference and customized parameters concerning video and audio such as color, brightness, and volume is called user preference information. In the user preference information table 33, the user preference (that is, sense preferred by user) and the parameters of video quality and audio quality are linked. For example, when the "relaxing mode" is selected as the user preference, the brightness is set to "+10", the black level is set to "0", the color density is set to "−5", the color shade is set to "light", the sharpness is set to "−5", the color temperature is set to "middle", the volume is set to "10", the low tone is set to "−3", and the high tone is set to "−3", In place of this, when the "alive mode" or the "concert mode" is selected as the user preference, parameters of different video quality and audio quality are set in conjunction with the selected result as shown in FIG. 12. The user preference information may be preliminarily stored in the rewritable ROM 16, or a user may add in the rewritable ROM 16 or edit using the input device 19. The reproduction environment information shown in FIG. 12 is merely exemplification; and a further item may further be used as the user preference, or a further parameter may be used.

Referring to FIG. 11 again, in step S43, the microcomputer 15 changes setting of a video signal processing unit 17 and a audio signal processing unit 18 in accordance with the selected user preference information. By this setting change, the standard video and standard audio outputted from the tuner 12 are customized according to user's preference which assumes a using location. Hereinafter, the processing of steps S44 to S46 is executed in a manner similar to that of the steps S12 to S14 shown in FIG. 4. After the video recording processing is ended, the user detaches a memory card 3 from a memory card slot 21A of the television video recorder apparatus 1, inserts the memory card 3 into a memory card slot 44A of a mobile terminal apparatus 2, and reproduces the moving picture file recorded in the memory card 3 of the mobile terminal apparatus 2.

According to the television video recorder apparatus 1 of the present embodiment, a moving picture file reproducible in user's intended video quality and volume can be generated even in the mobile terminal apparatus 2 by performing video recording complying with reproduction equipment, reproduction environment, and user preference while making the most of the features of small size and portability provided by the mobile terminal apparatus 2 such as a mobile phone or a PDA.

The video recorder apparatus according to the present invention is useful because on the assumption of the way of such use that a moving picture file stored in a detachable recording medium is enjoyed outdoors on a mobile terminal apparatus such as a mobile phone or a PDA, the moving picture file complying with reproduction environment and user preference can be generated so as to utilize the maximum performance concerning specifications of equipment to be used.

The invention claimed is:

1. A video recorder apparatus, comprising:
   an extracting unit configured to extract predetermined encoding conditions from a recording medium that stores a first moving picture file encoded by a further apparatus, the first movie picture file being encoded using the encoding conditions and including the encoding conditions;
   a first storage unit configured to store the extracted encoding conditions;
   an encoding unit configured to generate a second moving picture file by encoding a video signal and an audio signal to be recorded which are respectively different from a video signal and an audio signal of the first moving picture file in accordance with the encoding conditions stored in the first storage unit; and
   a storing unit configured to store the generated second moving picture file in one of the recording medium and another recording medium.

2. A video recorder apparatus, comprising:
   an extracting unit configured to extract respective encoding conditions from at least one recording medium that stores a plurality of first moving picture files encoded under a plurality of encoding conditions different from each other and encoded by respective further apparatuses, each of the first moving picture files having the respective encoding conditions;
   a first storage unit configured to store a plurality of extracted encoding conditions;
   an encoding unit configured to select one of the plurality of encoding conditions stored in the first storage unit, and generate a second moving picture file by encoding a video signal and an audio signal to be recorded which are respectively different from a video signal and an audio signal of each of the first moving picture files in accordance with the selected encoding conditions; and
   a storing unit configured to store the generated second moving picture file in one of at least one the recording medium and another recording medium.

3. The video recorder apparatus as claimed in claim 1, wherein the first and the second moving picture files encoded by the encoding conditions are reproduced by a predetermined reproduction apparatus.

4. The video recorder apparatus as claimed in claim 1, wherein the first storage unit further stores encoding conditions inputted by a user.

5. The video recorder apparatus as claimed in claim 1, further comprising:
   a second storage unit configured to store a plurality of items of reproduction environment information, each including a plurality of parameters upon executing a predetermined processing on the video signal and the audio signal in response to a plurality of reproduction environments different from each other upon reproducing a moving picture file;
   a selecting unit configured to select one of the plurality of items of reproduction environment information; and
   a signal processing unit configured to execute the predetermined processing on the video signal and the audio signal on the basis of parameters of the selected reproduction environment information, generate processed video signal and the audio signal, and supply a generated video signal and the audio signal to the encoding unit as the video signal and the audio signal to be recorded.

6. The video recorder apparatus as claimed in claim 5, wherein the second storage unit stores reproduction environment information inputted by a user.

7. The video recorder apparatus as claimed in claim 1, further comprising:
   a third storing unit configured to store a plurality of items of user preference information, each including a plurality of parameters upon executing a predetermined processing on the video signal and the audio signal in response to user preference;
   a selecting unit configured to select one of the plurality of items of user preference information; and
   a signal processing unit configured to execute the predetermined processing on the video signal and the audio signal on the basis of parameters of the selected user preference information, generate processed video signal and the audio signal, and supply a generated video signal and an audio signal to the encoding unit as the video signal and the audio signal to be recorded.

8. The video recorder apparatus as claimed in claim 7, wherein the third storing unit stores user preference information inputted by a user.

9. The video recorder apparatus as claimed in claim 2, wherein the first and the second moving picture files encoded by the encoding conditions are reproduced by a predetermined reproduction apparatus.

10. The video recorder apparatus as claimed in claim 2, wherein the first storage unit further stores encoding conditions inputted by a user.

11. The video recorder apparatus as claimed in claim 2, further comprising:
    a second storage unit configured to store a plurality of items of reproduction environment information, each including a plurality of parameters upon executing a predetermined processing on the video signal and the audio signal in response to a plurality of reproduction environments different from each other upon reproducing a moving picture file;
    a selecting unit configured to select one of the plurality of items of reproduction environment information; and
    a signal processing unit configured to execute the predetermined processing on the video signal and the audio signal on the basis of parameters of the selected reproduction environment information, generate processed video signal and the audio signal, and supply a generated video signal and the audio signal to the encoding unit as the video signal and the audio signal to be recorded.

12. The video recorder apparatus as claimed in claim 11, wherein the second storage unit stores reproduction environment information inputted by a user.

13. The video recorder apparatus as claimed in claim 2, further comprising:
    a third storing unit configured to store a plurality of items of user preference information, each including a plurality of parameters upon executing a predetermined processing on the video signal and the audio signal in response to user preference;
    a selecting unit configured to select one of the plurality of items of user preference information; and
    a signal processing unit configured to execute the predetermined processing on the video signal and the audio signal on the basis of parameters of the selected user preference information, generate processed video signal and the audio signal, and supply a generated video signal and audio signal to the encoding unit as the video signal and the audio signal to be recorded.

14. The video recorder apparatus as claimed in claim 13, wherein the third storing unit stores user preference information inputted by a user.

* * * * *